Figure 1:
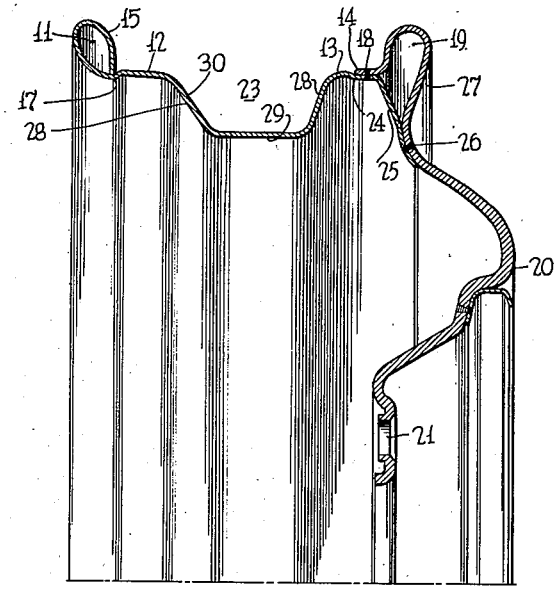
Figure 2:
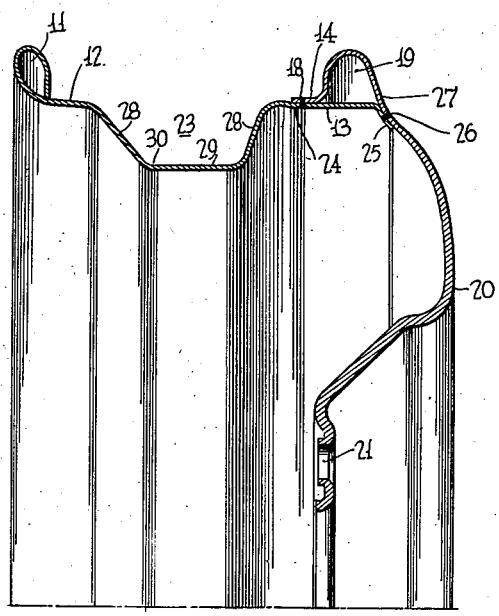

June 8, 1937.   C. L. EKSERGIAN   2,083,326
VEHICLE WHEEL
Original Filed Oct. 8, 1934

INVENTOR.
CAROLUS L. EKSERGIAN.
BY
ATTORNEY.

Patented June 8, 1937

2,083,326

UNITED STATES PATENT OFFICE 2,083,326

VEHICLE WHEEL

Carolus L. Eksergian, Detroit, Mich., assignor to Budd Wheel Company, Philadelphia, Pa., a corporation of Pennsylvania Application October 8, 1934, Serial No. 747,370
Renewed November 5, 1936

2 Claims. (Cl. 301—5)

This invention relates to vehicle wheels and more particularly to vehicle wheels of few fundamental parts and preferably of reduced polar moment of inertia and light gauge rim portions.

In modern high speed vehicle wheel construction is involved the application of pleasing appearance, great strength, light weight and reduced fly-wheel forces.

By this invention I have embodied in a wheel the foregoing objects and others not specifically enumerated.

This application is one of a series of four directed to the same general subject matter, the others being Ser. Nos. 747,369, 747,371 and 747,372.

In the two figures of the drawing, I have illustrated cross sectional illustrations of the upper half of a vehicle wheel taken transversely to the wheel plane. In the drawing the wheel incorporates especially a wheel body 20 of suitable outer contour and a rim member 30 of very light gauge metal. The wheel has a mounting flange portion 21, a center portion of proper shape and a peripheral portion 27 arranged to provide complementally with the rim member a hollow side wall.

The rim 30 is of light gauge sheet metal and in Fig. 1 has an inboard hollow annularly extending flange 11, an inner wall 15 of which is shown seated against an inner offset bead 17. The drop center portion 23 has side walls 28 and a drop base 29. Tire bead seats are additionally provided at 12 and 13, the latter of these seats resulting from a substantially axially extending portion 14 of the wheel body 20. The rim annulus terminates in a substantially radially inwardly extending flange 25 which is secured to the wheel body preferably through welding although other means may be used at the points 26. The rim portion is offset at 25 for the reception of the flanged portion 14 of the wheel body which is secured thereto by welding or other means in the points 18.

It is thus observed that there is obtained at 19 a hollow substantially box cross section of complemental portions of the rim and wheel body providing in the rim area a construction of great strength and light weight.

While by way of illustration and example I have described my invention in connection with a preferred embodiment thereof as to structure, and the preferred manner of practicing it, it will be obvious to those skilled in the art, after understanding the foregoing, that various changes and modifications may be made without departing from the spirit and scope of the invention, and I aim in the appended claims to cover all such modifications and changes.

What I claim is:

1. A sheet metal vehicle wheel comprising a light gauge sheet metal rim annulus of the drop center type having a hollow tubular inboard peripheral flange and a substantially radially inwardly extending outboard peripheral flange and a disc type wheel body secured to the inwardly extending flange of the rim and extending outwardly therefrom and secured to a tire bead seat portion of the rim and spaced from the rim member intermediate the zones of securement.

2. A sheet metal vehicle wheel comprising a light gauge sheet metal rim annulus of the drop center type having a hollow tubular inboard peripheral flange a substantially radially inwardly extending outboard peripheral flange, a bead seating portion, said bead seating portion having an offset portion therein and a disc type wheel body secured to the inwardly extending flange of the rim and extending outwardly therefrom and secured in said offset portion of the tire bead seat of the rim and spaced from the rim member intermediate the zones of securement.

CAROLUS L. EKSERGIAN.